March 13, 1962   D. B. TSCHUDY   3,024,603
JET ENGINE EXHAUST THRUST REVERSER
Filed Oct. 26, 1956   3 Sheets-Sheet 1

INVENTOR.
Donald B. Tschudy
BY
*M. Oldham*
ATTORNEY

INVENTOR.
Donald B. Tschudy
BY
ATTORNEY

March 13, 1962     D. B. TSCHUDY     3,024,603
JET ENGINE EXHAUST THRUST REVERSER Filed Oct. 26, 1956     3 Sheets-Sheet 3

INVENTOR.
Donald B. Tschudy
BY
ATTORNEY 3,024,603
JET ENGINE EXHAUST THRUST REVERSER
Donald B. Tschudy, Canton, Ohio, assignor to Goodyear Aircraft Corporation, Akron, Ohio, a corporation of Delaware
Filed Oct. 26, 1956, Ser. No. 618,561
2 Claims. (Cl. 60—35.54)

This invention relates to jet engine exhaust thrust reverser for airplanes, and, in particular, to such a thrust reverser which also may be adapted to serve as directional control device for the airplane.

The general object of this invention is to produce a thrust reverser of the character described which is simple in construction, efficient in performance, light in weight and reliable and durable in operation.

Another object of the invention is to make the reverser adapted to directional airplane control.

The aforesaid objects, and other objects which will become apparent as the description proceeds, are achieved by providing an exhaust pipe or nozzle with a pair of opposite side openings, each covered by a door substantially flush with the exhaust pipe wall and swingable towards the center of the pipe. Outside each door is placed a set of reacting vanes which, when the doors are moved inwardly by actuator means, deflect the exhaust gas stream sideways, and/or in a forward direction. This arrangement also permits the deflector doors, by proper control of the actuator means, to be used for directional control of the airplane by swinging both doors together out of the center position to one or the other side, and/or by covering the vanes of one side partially or completely and leaving the vanes of the other side open, in order to obtain a side thrust only against one side. Of course, any desirable door positions may be seletced. The functioning of this type of doors as a rudder is possible, because even when fully deflected for reversing the jet stream the doors do not completely block the exhaust pipe so that open spaces are left at the sides for moving both doors together to either side of the vertical center plane of the pipe to still effect a rudder action.

For a better understanding of the invention reference should be had to the accompanying drawings, wherein.

Figure 1:
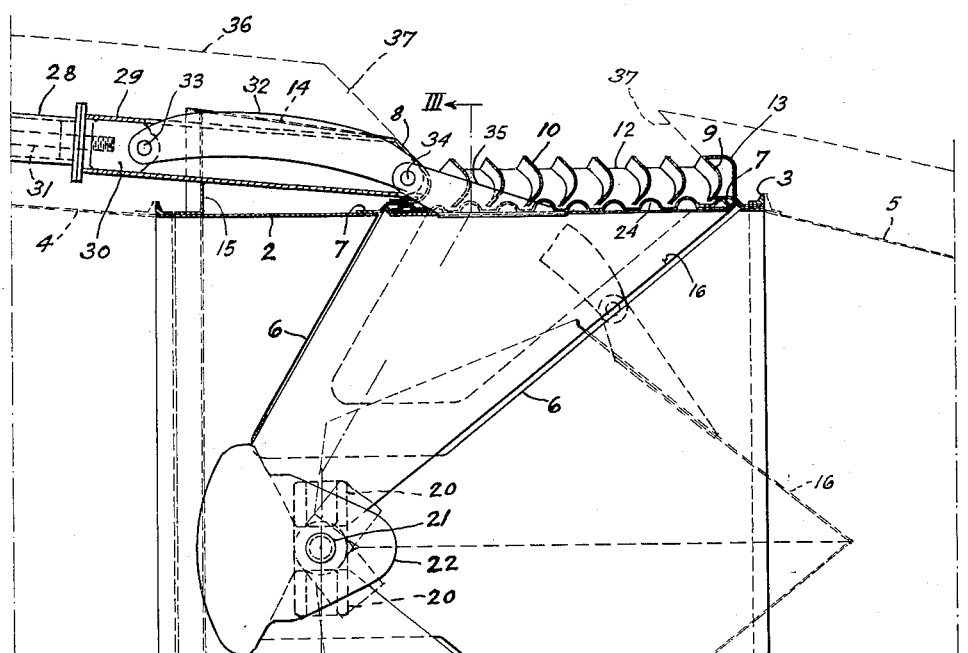
FIG. 1 is a cross-sectional partial view taken on line I—I of FIG. 2 of one embodiment of the invention showing the exhaust nozzle arranged behind the thrust reverser.
Figure 2:
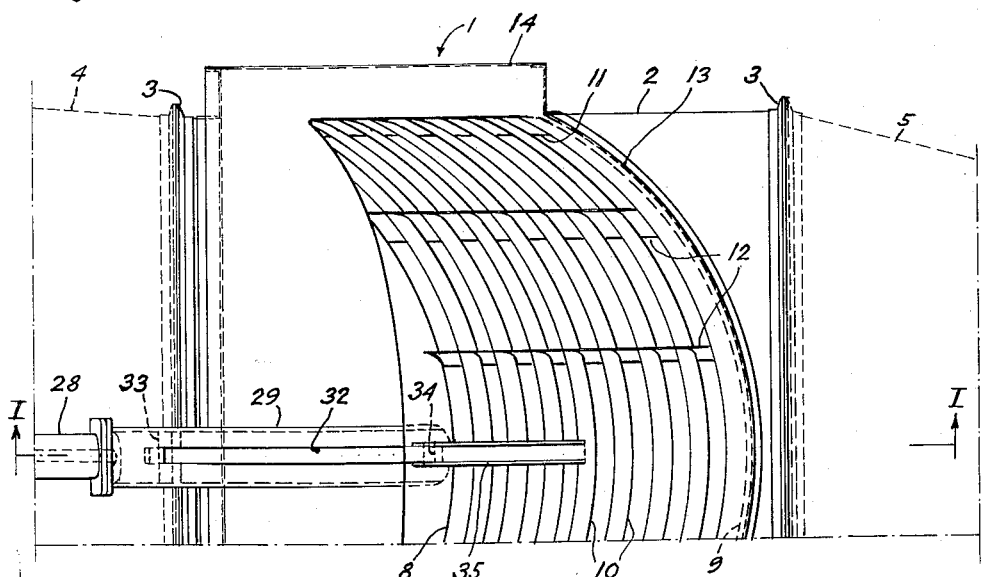
FIG. 2 is a partial side view.
Figure 3:
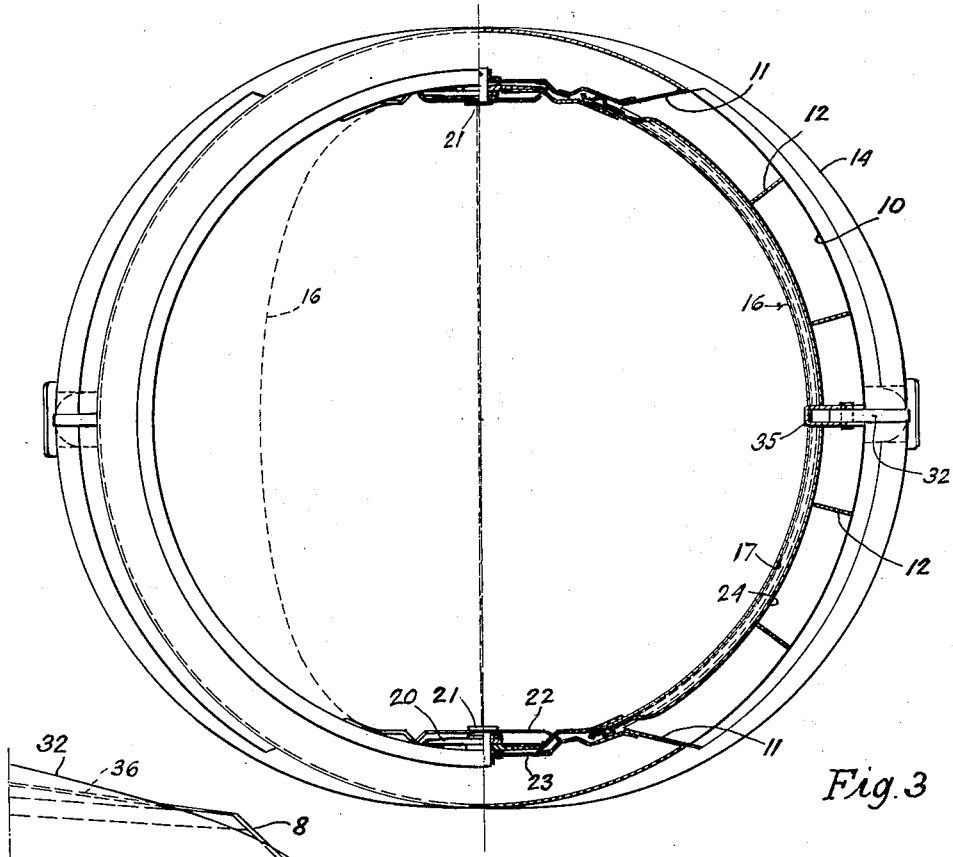

FIG. 3, left side, is a rear view and, right side, a cross-sectional view taken substantially on line III—III of FIG. 1.

Figure 4:
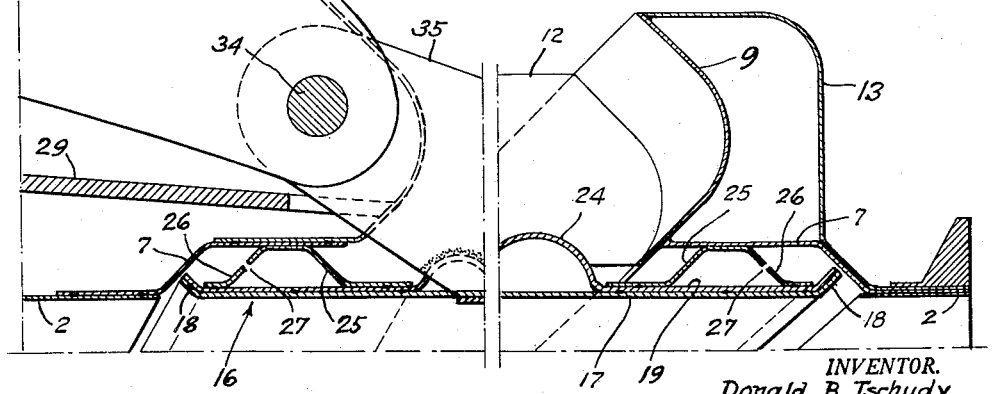

FIG. 4 shows in enlarged scale a detail of the door seal illustrated in FIG. 1.

Figure 5:
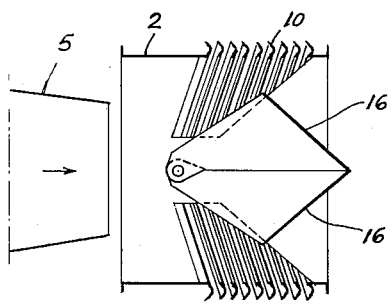

FIG. 5 is a diagrammatic view of a thrust reverser arranged behind the jet nozzle, showing the doors in center position.

Figure 6:
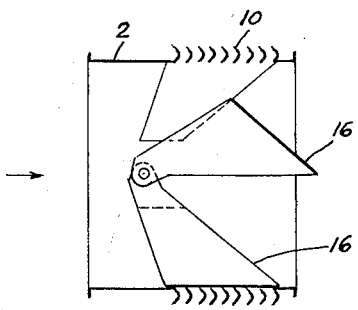
Figure 7:
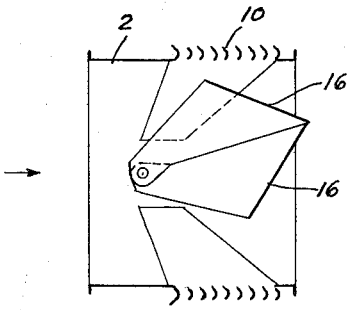

FIGS. 6 and 7 are like FIG. 5, but are somewhat more diagrammatic, and show the doors in various positions adapted for controlling the airplane directionally.

Figure 8:
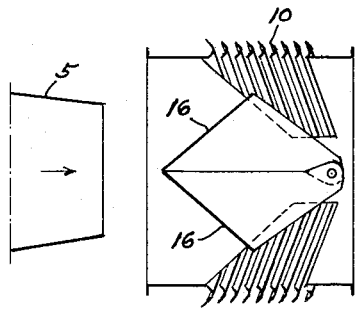

FIG. 8 is similar to FIG. 5 but shows a modification of the invention wherein the doors face in opposite direction to that illustrated in FIG. 5.

Figure 9:
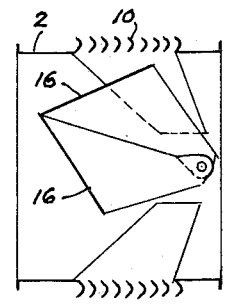

FIG. 9, slightly more diagrammatic than FIG. 8, shows the doors of FIG. 8 in a position for directional control of an airplane.

Figure 10:
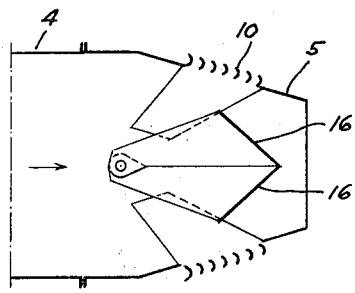
Figure 11:
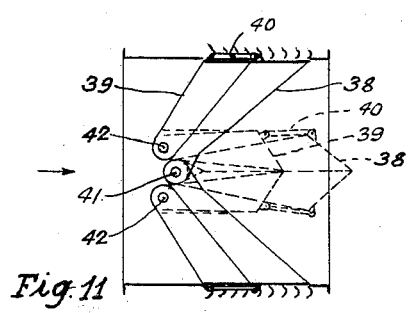

FIG. 10 shows another modification of the invention wherein a thrust reverser is positioned within a jet nozzle, and FIG. 11 illustrates a modification of the reverser door construction.

With specific reference to the form of the invention illustrated in FIGS. 1 to 4 of the drawings, the numeral 1 indicates in general a complete thrust reverser assembly consisting of a cylindrical duct 2 provided with end flanges 3, one of which is attached to an engine tail pipe 4 and the other to a jet nozzle 5. Into the duct 2 are cut diametrically opposite tow side openings 6 of mouth-like or crescent shape. As seen in the drawings, each opening 6 may be said to have side edges substantially parallel to the axis of duct 2, a front edge defined by a plane inclined rearwardly at an angle of less than 90° and more than 45° to the axis, and a back edge defined by a plane inclined rearwardly at an angle of about 45° to the duct axis. To the edges of each opening is securely attached a frame structure 7 to which are connected front and rear reaction vanes 8 and 9. Therebetween are uniformly spaced reaction vanes 10 which are sealed off at their ends by being secured to side walls 11 and fastened to frame 7. The vanes 10 are spaced most widely apart near or at their center portions and curve closer together near their ends as shown in the drawings. All the vanes are tied together by a series of spacers 12. The outer contour of vane 9 is connected to a surrounding stiffening member 13 forming, together with a shroud 14 supported by a bulkhead 15 and secured to the outer edge of the vane 8, a rigid housing for the reaction vanes.

For closing the openings 6 swingable doors 16 are provided of round cross-sectional shape having their inside flush with the inside of the duct 2. Each door 16, while of half-round cross-section, has a "bird-beak" or "knight's visor" shape to cover the mouth-like opening 6 in the manner best seen from the drawings.

Additionally, with respect to the shape of the doors it will be evident that the bird-beak or knights' visor shape is such that when the doors are moved together to the position shown in FIG. 5, for example, that the contacting edges of the doors most remote from the pivot engage at an angle of less than 90° and that the edges of the doors substantially seal with each other from one pivot pin 21 to the other pivot pin 21. In other words, the mating edges of the doors 16 lie in a common plane including the pivot pins 21.

Each door 16, used as exhaust jet deflectors, consists of an inner smooth sheet 17, having outwardly turned edge portions 18, and of an outer corrugated reinforcing sheet 19 spot-welded to the sheet 17. The door pivot potions are provided with fittings 20 having holes through which pass the diametrically aligned pins 21, each pin being carried in a supporting plate 22 and 23 respectively, the latter being diametrically opposed.

As can best be seen in FIG. 1, the downstream or rear circumferentially extending edge of the door 16 lies within a plane inclined to the longitudinal axis of the duct 2 and also containing the door axis which in turn passes through the centerpoint of the pivot pins 21. The door axis intersects the longitudinal axis of the duct at a point lying upstream or forward of the projection on the duct axis of the fore-and-aft centerline of the opening 6. The upstream or forward circumferentially extending edge of the door 16 lies within a plane also inclined to the longitudinal axis of the duct 2 and with the plane of the forward door edge converging toward the plane of the rear edge. It will be apparent that the door axis may intersect the longitudinal axis of the duct 2 at a point which is within the projection of the fore-and-aft centerline of the opening 6 on the longitudinal duct axis, provided that provision is made for the forward edge of the doors 16 to clear the adjacent edge of the opening 6 in proper manner.

The corrugations 24 in the sheet 19 are contoured so that they will fit, in the closed position of the door, into the spaces between the curved reacting vanes 8, 9, and 10. The edges of the doors are provided with a seal in form of a channel-shaped molding (best seen in FIG. 4) made in two pieces 25 and 26 slightly spaced at 27 from each other to permit entrance of the pressurized exhaust gases into said molding to expand it in sealing relation against the door support 7.

The operation of each door is effected by an individual hydraulically operated cylinder 28 flanged to a tubular guide 29, fixed to but extending through the vane 8 and the bulkhead 15, and in which slidably moves a block 30 secured to a piston rod 31. A link 32 connects by pivots 33 and 34, respectively, the block 30 with a bracket 35 which is fastened to the door 16. The top of the guide 29, as well as certain of the vanes 10, are slotted as much as is necessary to make room for the moving link 32 and bracket 35. The airframe cover 36, as well as shroud 14, are provided with ducts 37 for the exit of the exhaust gases from the reverser.

In FIG. 10 is shown a modification of the invention wherein the thrust reverser is built into the nozzle 5 rather than being positioned as shown in the arrangement of FIG. 1.

The aforedescribed construction of a thrust reverser may be installed in a tail pipe in different locations, either, as shown in FIG. 1, in front of the nozzle, or as illustrated in FIG. 5, behind the nozzle, or as in FIG. 10, in the nozzle itself, depending on the type of airplane.

In FIGS. 5, 6 and 7, the doors 16 with their pivots located upstream from the doors are shown in various deflected positions, with both doors in contact with each other in center position (FIG. 5); with only one door deflected giving unsymmetrical side thrust and rear thrust (FIG. 6); and with both doors in contact with each other and deflected sideways to obtain differential side thrust or rudder action (FIG. 7). With the door pivots located upstream and the doors being in jet stream reverser position (FIG. 5), in case of power failure of the door actuators the doors will return automatically to the position for rearward exhaust thrust. This is desirable for a quick get-away at a landing in case an obstacle to be avoided should suddenly appear. Further, the advantage of swingable doors adapted to be used as directional control surfaces will contribute to facilitate maneuverability of an airplane.

In the operation of the forms of the invention having the door pivots upstream from the doors, and with the doors 16 engaging each other (for example the dotted line showing in FIG. 1), a pocket of substantially non-moving gas is trapped between the doors, and the moving exhaust gases or at least a considerable portion thereof are deflected rather smoothly through vanes 8, 9 and 10 to effect maximum reverse thrust.

In the modified arrangement with the door pivots located downstream from the doors and the doors in jet stream reverser position (FIGS. 8 and 9), the doors will remain in such position upon hydraulic failure of the actuators. This can be desirable when making an airplane landing. Which of the two pivot locations hereinbefore described should be selected depends on the type of service for which an airplane is intended.

Another modification of the invention is illustrated in FIG. 11 by making each door in two parts 38 and 39 connected by links 40 and of which the parts 38 turn about a common pivot 41 and the parts 39 about separated pivots 42. The doors are shown by dotted lines in deflected center position giving minimum width. The effective combined width of the two door parts 38 is dependent upon their relative angular relation or position and can be selected to provide the desired reverser action.

While certain representative embodiments and details have been shown for the purpose of illustrating the invention it will be apparent to those skilled in the art that various changes and modification may be made therein without departing from the spirit or scope of the invention.

I claim:
1. Fluid flow thrust reversing apparatus comprising, a substantially cylindrical pipe, crescent shaped passageway opening means formed in the walls of the pipe and including a pair of passageways having diametrically opposite relationships, the passageways having longitudinal side walls extending substantially parallel with each other and with the axis of the pipe, each of the inner edges of the front walls of said pipe passageways being substantially defined by the intersection of said cylinder and a plane extending rearwardly at an acute angle and with the inner edges of the rear walls substantially defined by the intersection of said cylinder and a plane inclined rearwardly at an angle which is substantially less than that for the front walls, a plurality of radially curved vanes extending transversely over each of the passageways from substantially side edge to side edge of the passageways and supported on the pipe to form crescent shaped passages, crescent shaped doors mounted on common pivot means and including edge means thereof operable within the pipe for closing the passageways by filling the openings thereof in complementary fashion, said common pivot means having an axis lying forwardly of the longitudinally longest portion of each door, corrugated rib means on the outer side of the doors to reinforce them, said rib means including members conforming with the curvature of the vanes and passages formed thereby for extending up and lying between the plurality of vanes, control means for independently moving the doors to any of a desired plurality of positions inside the pipe including contact and for selectively synchronized unitary movement when in contact to position the doors as a unit for directing the deflection of the fluid flow to selected passages.

2. A fluid thrust reverser including a substantially cylindrical pipe, crescent shaped passageway opening means in the walls of the pipe including a pair of passageways having diametrically opposite relationships, the passageways including longitudinally extending sidewalls substantially parallel with each other and with the axis of the pipe, each of the inner edges of the front walls of said pipe passageways being substantially defined by the intersection of said cylinder and a plane extending rearwardly at an angle and with the inner edges of the rear walls substantially defined by the intersection of said cylinder and a plane inclined rearwardly at an angle which is less than that for the front walls, a plurality of radially curved vanes transversely covering each of the passageways and with the rear vanes positioned substantially parallel to the rear wall of each of the passageways while extending from substantially side edge to side edge of the passageways to form a plurality of crescent shaped passages, crescent shaped doors including flanged edge means mounted on common pivot means and operable within the pipe for closing the passageways by filling the openings thereof in complementary fashion, said common pivot means having an axis lying forwardly of the longitudinally longest portion of each door, corrugated rib means on the outer side of the doors to reinforce them, said rib means including members conforming with the passages formed by the vanes for extending up and lying between the passages, control means for independently moving the doors to any of a desired plurality of flow deflecting positions including contact with each other inside the pipe for controlled unitary action by the doors in directing the deflection of fluid flow within the pipe to selected passages.

References Cited in the file of this patent

UNITED STATES PATENTS

| | | |
|---|---|---|
| 2,551,372 | Haltenberger | May 1, 1951 |
| 2,568,813 | Lundberg | Sept. 25, 1951 |
| 2,620,622 | Lundberg | Dec. 9, 1952 |
| 2,680,948 | Greene | June 15, 1954 |

(Other references on following page)

UNITED STATES PATENTS

| | | |
|---|---|---|
| 2,735,262 | Geary | Feb. 21, 1956 |
| 2,780,058 | Beale et al. | Feb. 5, 1957 |
| 2,794,319 | Stockdale | June 4, 1957 |
| 2,847,823 | Brewer | Aug. 19, 1958 |
| 2,944,394 | Peregrine | July 12, 1960 |
| 2,945,346 | Arnzen | July 19, 1960 |

FOREIGN PATENTS

| | | |
|---|---|---|
| 1,112,592 | France | Nov. 16, 1955 |
| 1,112,593 | France | Nov. 16, 1955 |